United States Patent Office 3,404,123
Patented Oct. 1, 1968

3,404,123
POLYMERS HAVING IMPROVED OXIDATION
RESISTANCE
Leo J. McCabe, Glassboro, Harry J. Andress, Jr., Pitman, and Francis M. Seger, Edison, N.J., assignors to Mobil Oil Corporation, a corporation of New York
No Drawing. Filed May 19, 1965, Ser. No. 457,175
17 Claims. (Cl. 260—45.8)

ABSTRACT OF THE DISCLOSURE

Homopolymers and copolymers of olefins are stabilized against oxidation by incorporating therewith certain 9,10-boroxarophenanthrene compounds. Dilauryl-3,3'-thiodipropionate or a polyalkyl-hydroxyaromatic compound may also be incorporated.

This invention relates to polymeric materials having improved resistance against oxidation. More particularly, it relates to polymers stabilized against oxidation by a 9,10-boroxarophenanthrene compound.

Various polymeric materials, including particularly those produced by polymerization of a polymerizable mixture containing at least one olefinic hydrocarbon, have in recent years become important in the manufacture of many useful articles. Such articles are generally manufactured and often used under conditions in which there is a tendency for the polymers to become oxidized. Particularly when those conditions include an elevated temperature, such as those employed to facilitate extrusion, molding or rolling of polymeric materials into useful configurations or those encountered in uses such as electrical insulation, the polymeric material usually undergoes oxidative degradation, which customarily results in an undesirable reduction of the tensile strength, flexibility or other advantageous properties of the polymeric material.

Various anti-oxidants and stabilizers have been incorporated in polymeric materials in the past to inhibit such oxidative degradation. Many of such additives have been insufficiently effective, while many others have caused undesirable side effects, e.g. excessive degradation of the color of the polymeric material.

It has now been found that certain compounds which may be characterized as 9,10-boroxarophenanthrenes are capable of improving the resistance of polymeric materials to oxidative degradation. Thus, the present invention provides a polymer-containing composition having improved oxidation resistance and comprising (1) a normally solid polymer of a polymerizable composition containing at least one olefinic hydrocarbon and (2) a minor amount of a 9,10-boroxarophenanthrene compound, said minor amount being based on the weight of said polymer and sufficient to increase the oxidation resistance thereof.

It has also been found that the oxidation resistance of polymeric materials can be significantly improved by incorporating therein a combination of a 9,10-boroxarophenanthrene compound and dilauryl-3,3'-thiodipropionate or a polyalkyl-hydroxyaromatic compound such as a benzenoid compound containing at least two hydroxy groups and at least three primary or secondary alkyl groups of at least 12 carbon atoms attached to the benzene nucleus, e.g. tri(2-hexadecyl)hydroquinone, tri(dodecyl)catechol, tri(2-tetradecyl)phloroglucinol, etc., or a naphthol containing at least two alkyl groups attached to the naphthol nucleus, e.g. di(hexyl)-1-naphthol, tri(octadecyl)-1-naphthol, tetra(hexadecyl)-1-naphthol, etc.

Thus, as a particularly useful embodiment of the afore-described novel composition, the invention provides a polymer-containing composition having improved oxidation resistance and comprising (1) a normally solid polymer of a polymerizable composition containing at least one olefinic hydrocarbon, (2) a 9,10-boroxarophenanthrene compound and (3) a compound selected from the group consisting of dilauryl-3,3'-thiodipropionate and polyalkyl-hydroxyaromatic compounds, said (2) and (3) being together present in a minor amount based on the weight of said polymer and sufficient to increase the oxidation resistance thereof.

The compounds characterized herein as 9,10-boroxarophenanthrenes may be represented by the structural formula:

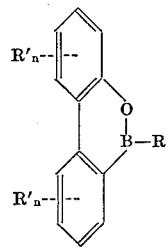

wherein R represents hydrogen, hydroxy, hydrocarbyl, oxyhydrocarbyl, halogen, halogenated hydrocarbyl, halogenated oxyhydrocarbyl, aminoethoxy, N-hydrocarbyl-aminoethoxy, N,N-dihydrocarbyl-aminoethoxy or, in the case of the anhydride, oxy-9,10-boroxarophenanthrene; R' represents hydrocarbyl, halogen or halogenated hydrocarbyl; and $n$ is zero or an integer from 1 to 4.

As used herein, the term "hydrocarbyl" is intended to mean a group composed of carbon and hydrogen atoms, such as an alkyl, alkenyl, aryl or alicyclic group or a structural combination of two or more of such groups, e.g. an alkaryl or aralkyl group. Thus, R in the structural formula can be hydrogen; hydroxy; an alkyl group (straight-chain or branched-chain) such as methyl, ethyl, propyl, isopropyl, butyl, isobutyl, tert-butyl, octyl, dodecyl, hexadecyl, octadecyl, tetracosyl, triacontyl, etc.; an alkenyl group such as ethenyl, propenyl, isopropenyl, etc.; an aryl group such as phenyl, naphthyl, etc.; an alkaryl group such as methylphenyl, amylphenyl, etc.; an aralkyl group such as phenylmethyl, phenyloctyl, etc.; an alicyclic group such as cyclohexyl, cyclohexenyl, etc.; an oxyhydrocarbyl group such as any of the aforementioned hydrocarbyl groups linked by a single bond to an oxygen atom, e.g. an alkoxy group such as methoxy, ethoxy, etc., or an aryloxy group such as phenoxy, etc.; a halogen such as chlorine, bromine or iodine; a halogenated hydrocarbyl or halogenated oxyhydrocarbyl group such as any of the aforementioned hydrocarbyl or oxyhydrocarbyl groups additionally containing one or more halogen substituents; an aminoethoxy group having two hydrogen atoms, two of the aforementioned hydrocarbyl groups or one hydrogen atom and one of such hydrocarbyl groups attached to the nitrogen atom of the amino group; or an oxy-9,10-boroxarophenanthrene group (unsubstituted or having one to four of the substituents designated as R' on either or both of the carboxylic rings therein).

Each of the substituents shown as R' in the structural formula can be the same as or different from each other and may be selected from any of the halogens or hydrocarbyl or halogenated hydrocarbyl groups described hereinbefore as suitable for R. Among the hydrocarbyl, oxyhydrocarbyl, and halogenated hydrocarbyl and oxyhydrocarbyl groups which are suitable for use as R or R', those containing from one to about 30, and particularly from one to about 18 carbon atoms are especially preferred. It is also preferred that $n$ is zero, one or two, and even more preferred that $n$ is zero.

The following are representative of the many 9,10-boroxarophenanthrene compounds which are useful in the present invention, and are included here only for purposes of illustration and not limitations:

9-hydroxy-9,10-boroxarophenanthrene,
di-octadecyl-9-hydroxy-9,10-boroxarophenanthrene,
the anhydride of 9-hydroxy-9,10-boroxarophenanthrene,
9-tert-butoxy-9,10-boroxarophenanthrene,
9-methoxy-9,10-boroxarophenanthrene,
9-chloro-9,10-boroxarophenanthrene,
9-phenyl-9,10-boroxarophenanthrene,
the aminoethyl ester of 9-hydroxy-9,10-boroxarophenanthrene,
the diethylaminoethyl ester of 9-hydroxy-9,10-boroxarophenanthrene,
the 1,1,7-trihydroperfluoro-heptyl ester of 9-hydroxy-9,10-boroxarophenanthrene,
the 2,2-difluoro-dodecyl ester of 9-hydroxy-9,10-boroxarophenanthrene,
1,3-dibromo-9-hydroxy-9,10-boroxarophenanthrene, and
1,3,7-tribromo-9-hydroxy-9,10-boroxarophenanthrene.

The 9,10-boroxarophenanthrene compounds shown in the structural formula herein before are surprisingly effective antioxidants and have anti-oxidant properties which are markedly superior to those of various anti-oxidants which are currently in wide commercial use. While organo-boron compounds have been employed heretofore as anti-oxidants, such prior art compounds were all, to the best of our knowledge, of the borate type, which is hydrolytically unstable and exhibits only moderate anti-oxidant effectiveness. The 9,10-boroxarophenanthrene compounds useful in this invention are not borates. For example, 9-hydroxy-9,10-boroxarophenanthrene, a preferred compound for use in this invention, may be described as an internal ester of 2-(2-hydroxyphenyl)-phenylboronic acid wherein the ring system containing the boron atom possesses an unusual degree of stability due to its aromaticity. The anhydride of 9-hydroxy-9,10-boroxarophenanthrene is hydrolytically stable.

Methods for preparation of the 9,10-boroxarophenanthrene compounds useful in this invention are, in general, known to the art. For example, the methods described by Dewar and Dietz in the Journal of the Chemistry Society (London), 1344 (1960) may be employed. The preparation of 9-hydroxy-9,10-boroxarophenanthrene is exemplary of these procedures. Briefly, orthophenylphenol is reacted with excess boron trichloride. The intermediate product from this reaction is then heated in the presence of aluminum chloride to give 9-chloro-9,10-boroxarophenanthrene, which is then treated with water to give the desired 9-hydroxy-9,10-boroxarophenanthrene.

Although the anti-oxidant compounds useful in this invention are referred to herein as boroxarophenanthrenes, according to "Chemical Abstracts" this type of structure may also be termed the dibenz [c,e] [1,2] oxoborin system. Thus, based on the "Chemical Abstracts" nomenclature, 9-hydroxy-9,10-boroxarophenanthrene is 6-hydroxy-dibenz [c,e] [1,2] oxaborin.

The following is a description of a method whereby 9-hydroxy-9,10-boroxarophenanthrene, an exemplary member of the class of compounds useful in the present invention, has been prepared.

Boron trichloride (235 grams, two moles) was bubbled into a one-liter flask containing 200 milliliters of dry methylene chloride at —70° C. The flask had been purged with nitrogen prior to the addition of the boron trichloride. A solution of 170 grams (one mole) of orthophenylphenol in 200 milliliters of methylene chloride was added dropwise to the flask. During this addition the flask contents were stirred, blanketed with nitrogen, and the temperature was maintained between —50° C. and —70° C. After the addition was completed (1.5 hours), the mixture was stirred at —70° C. for 30 minutes and then allowed to warm gradually to room temperature (about 27° C). Hydrogen chloride, which evolved during the warming, was trapped in a caustic solution. The mixture was stirred at room temperature for 16 hours and then excess boron trichloride and solvent were removed at 25° C. and 0.2 millimeter of mercury. A brown, viscous liquid was obtained. The residue was dissolved in 200 milliliters of hexane, five grams of aluminum chloride was added, and the mixture was heated to 50° C. and maintained at that temperature for 14 hours. Hydrogen chloride evolved continuously but had nearly subsided at the end of the 14-hour period. The product was filtered, most of the hexane was removed under reduced pressure, and 200 milliliters of ether was added to the residue. The resulting solution was transferred to a separatory funnel containing 400 milliliters of water. The hydrolysis was exothermic. The organic layer was isolated and concentrated under reduced pressure, yielding a solid. Recrystallization from benzene gave a crystalline material having an uncorrected melting point of 210° C. The melting point reported by Dewar and Dietz in J. Chem. Soc. (London), 1344–47 (1960), was 202–203° C. The ultraviolet spectrum of the crystalline product was identical to that reported by Dewar and Dietz. Hydroxyl absorption at 3410 cm.$^{-1}$ was noted in the infrared. Analysis of the product showed that it contained 5.50% boron. The calculated boron content of 9-hydroxy-9,10-boroxarophenanthrene ($C_{12}H_9O_2B$) is 5.51%.

Methods for preparation of the anhydrides of compounds containing a B-OH group are also well known in the art. For example, the anhydride of 9-hydroxy-9,10-boroxarophenanthrene can be prepared by heating the hydroxyl compound at an elevated temperature, e.g. 110° C., for several hours.

In one method for the preparation of the anhydride of 9-hydroxy-9,10-boroxarophenanthrene, 20 grams of 9-hydroxy-9,10-boroxarophenanthrene was pulverized and heated at 100–110° C. for four hours. The crystalline product which was obtained melted at 208–210° C. and contained 5.35% boron. The calculated boron content of the anhydride of 9-hydroxy-9,10-boroxarophenanthrene is 5.42%. The infrared spectrum of the product showed no absorption at 3410 cm.$^{-1}$, indicating the substantial absence of the hydroxyl form of 9,10-boroxarophenanthrene. Strong absorption at 1260 cm.$^{-1}$ and 1370 cm.$^{-1}$ (which are characteristic of the B-O-B group) were observed.

The other embodiments of the 9,10-boroxarophenanthrene compounds shown by the structural formula hereinbefore can also be prepared by methods known to the art. For example, the esters of 9-hydroxy-9,10-boroxarophenanthrene can be prepared by methods normally used for esterification of similar hydroxyl compounds, and embodiments having one or more of the ring substituents shown as R' can be prepared by starting with a similarly substituted ortho-phenylphenol in the aforedescribed preparation of 9-hydroxy-9,10-boroxarophenanthrene.

The polymers to which this invention imparts improved oxidation resistance include those homopolymers and copolymers which are obtained, as aforesaid, by polymerization of a polymerizable composition containing at least one olefinic hydrocarbon. Preferably, the olefinic hydrocarbon is alpha-olefinic, i.e., a compound having the structure $CH_2=CR_2$, wherein each R is the same as or different from the other R and can be hydrogen or an alkyl, alkenyl, aryl, aralkyl, alkaryl or alicyclic group which preferably contains from one to eight carbon atoms. The polymers obtained therefrom include homopolymers such as polyolefins, e.g. polyethylene, polypropylene and poly-1-butene, and polyvinylbenzenes, e.g. polystyrene and poly(alpha-methylstyrene), as well as copolymers such as those of a polyvinylbenzene (e.g. styrene) and an olefin (e.g. ethylene), different polyvinylbenzenes (e.g. styrene and alpha-methyl-styrene), and high-impact polystyrene prepared by copolymerizing rubbery material (e.g. natural or synthetic rubber) with styrene. Of the foregoing polymeric materials, homopolymers of lower ($C_2$ to $C_4$) olefins, particularly polypropylene, and copolymers such as high-impact polystyrene exhibit especially improved oxidation resistance when, in accordance with the present invention, a 9,10-boroxarophenanthrene compound is incorporated therein, either with or without another anti-oxidant, e.g. dilauryl-3,3'-thiodipropionate or a polyalkyl-hydroxyaromatic compound such as tri(2-hexadecyl) hydroquinone.

The amount of a 9,10-boroxarophenanthrene compound which is incorporated in a polymer-containing composition in accordance with this invention is, as aforesaid, a minor amount sufficient to improve the oxidation resistance of the polymer. With many polymeric materials, good results can be obtained by incorporation of as little at 0.01% by weight of a 9,10-boroxarophenanthrene compound. The preferred amounts for specific uses will differ with the nature of the polymeric material, the amount of other anti-oxidants which are included therein, the severity of the oxidizing conditions to which it will be exposed during processing and/or use, etc. However, in most cases, a concentration between about 0.02% and 0.50% or higher of a 9,10-boroxarophenanthrene compound, based on the weight of the polymer, is preferred. In general, the greater the concentration of a 9,10-boroxarophenanthrene compound in the polymer-containing composition, the greater the oxidation resistance of the composition.

When used together with a minor amount of a polyalkylhydroxyaromatic compound or dilauryl-3,3'-thiodipropionate, the amounts used can be in any desired ratio and need only be great enough that they are together sufficient to increase the oxidation resistance of the polymer in which they are incorporated. In some cases, e.g. in the incorporation of a combination of the anhydride of 9 - hydroxy - 9,10-boroxarophenanthrene and tri(2-hexadecyl) hydroquinone in high-impact polystyrene, the degree of oxidation resistance imparted to the polymeric material by the combination may be greater than that which would result from incorporation of an equal amount of either constituent of the combination. Thus, when a combination of anti-oxidants is to be used, it will generally be preferred to employ a 9,10-boroxarophenanthrene compound in an amount between about 0.02% and about 0.25%, based on the weight of the polymer, in combination with an amount of dilauryl-3,3'-thiodipropionate of a polyalkyl-hydroxyaromatic compound, e.g. tri(2 - hexadecyl)hydroquinone, between about one and about five times that of the 9,10-boroxarophenanthrene compound used. If desired, the polymer-containing compositions of this invention can also contain any of a variety of other additives normally used for improvements of such compositions, e.g. other anti-oxidants, dyes, etc.

Any of the anti-oxidant compounds or combinations thereof which are usefully incorporated in the polymer-containing compositions of this invention can be incorporated therein by any of various known techniques, e.g. by blending in a Waring Blendor, a plastograph, a kneading mixer or the like, preferably after drying and pulverizing the boroxarophenanthrene compound (and the polyalkyl-hydroxyaromatic compound or dilauryl-3,3'-thiodipropionate, if a combination of anti-oxidants is to be used).

In order to evaluate the effectiveness of the aforedescribed 9,10-boroxarophenanthrene compounds and their combinations with a representative polyalkyl-hydroxyaromatic compound or dilauryl-3,3'-thiodipropionate in improving the oxidation resistance of polymeric materials, samples of polymers having such compounds and combinations incorporated therein were subjected to oxidation conditions similar to those encountered during conventional processing of the polymers into useful configurations. For comparison purposes, samples of the same polymers containing comparable amounts of other compounds which are widely used as polymer anti-oxidants and samples containing no anti-oxidant additives were subjected to the same oxidation conditions.

More specifically, the oxidation resistance of the polymer-containing compositions of this invention were tested by dividing a 20 gram sample of each composition among three seven-centimeter flat-bottom aluminum foil dishes previously cleaned with a 1:1 mixture of acetone and toluene, and heating the sample-containing dishes for two hours at 185° C. in a forced air circulation oven having good temperature control and no local temperature non-uniformities. Thereafter, the samples were allowed to cool to room temperature, visually rated for color degradation relative to the other samples in the same run, and then cut into strips for use in determination of the melt index of each sample.

Melt index, as measured by ASTM Method D1238, provides a measure of the flow rate of a thermoplastic through the orifice of an extrusion plastometer under specified conditions of temperature and pressure. Comparison of such flow rates of a sample before and after exposure to oxidation conditions provides a reliable measure of the degree of oxidative degradation caused by the exposure, with a higher flow rate indicating a higher degree of oxidative degradation. Thus, the smaller the increase in melt index of a sample during exposure to oxidation conditions, the greater the oxidation resistance of the sample. Accordingly, a comparison of the increases in melt index of several samples of the same polymer containing no anti-oxidant, different anti-oxidants and/or different amounts of anti-oxidants will provide a measure of the effectiveness of each anti-oxidant relative to no anti-oxidant, other anti-oxidants and/or different amounts of the same anti-oxidant.

The following specific examples are for the purpose of illustrating the oxidation resistance of various of the novel polymer-containing compositions of this invention. It will be apparent that this invention is not limited to the specific polymers or anti-oxidant compounds used in the examples, but that other polymers, other anti-oxidant compounds and combinations and concentrations thereof can be used, as those skilled in the art will readily appreciate.

Example I 9-hydroxy-9,10-boroxarophenanthrene was thoroughly blended at several different concentrations in samples of a high-impact polystyrene resin of a type which is commercially available. Combinations of 9 - hydroxy - 9,10-boroxarophenanthrene and tri(2-hexadecy)hydroquinone were blended in several concentrations with other samples of the same resin. One resin sample containing no anti-oxidant was used for purposes of a control run. All of the samples were placed in the aluminum dishes and subjected to the oxidation conditions described hereinbefore. Thereafter, visual observation of the colors of the oxidized samples revealed that (1) the colors of all polymers which included only 9-hydroxy-9,10-boroxarophenanthrene were less degraded than that of the sample which contained no anti-oxidant, and (2) color degradation varied inversely with the concentration of 9-hydroxy-9,10-boroxarophenanthrene in the samples, whether it was included as a single anti-oxidant or in combination with tri(2-hexadecyl)hydroquinone.

Thereafter, the melt index of the unoxidized resin and of each of the oxidized samples was measured by ASTM Test Method D1238 at 230° C. and with a weight of 1200 grams on the rod (the calculated equivalent of 24.0 p.s.i.). The results are set forth in Table I, in which each sample is identified by the anti-oxidant which it included and the concentration in which the anti-oxidant was employed.

TABLE I.—EFFECTIVENESS OF ANTI-OXIDANTS IN HIGH-IMPACT POLYSTYRENE

| Sample No. | Anti-oxidant(s) | Concentration of anti-oxidant in polymer, wt. percent | Melt index | | |
|---|---|---|---|---|---|
| | | | Before oxidation | After oxidation | Change due to oxidation |
| 1 | None | | 0.29 | 1.79 | 1.50 |
| 2 | 9-hydroxy-9,10-boroxarophenanthrene | 0.02 | 0.29 | 1.58 | 1.29 |
| 3 | do | 0.05 | 0.29 | 1.37 | 1.08 |
| 4 | do | 0.10 | 0.29 | 0.87 | 0.58 |
| 5 | Tri(2-hexadecyl)hydroquinone | 0.10 | 0.29 | 1.66 | 1.37 |
| 6 | 9-hydroxy-9,10-boroxarophenanthrene<br>Plus Tri (2-hexadecyl)hydroquinone | 0.025<br>0.075 | 0.29 | 1.18 | 0.89 |
| 7 | 9-hydroxy-9,10-boroxarophenanthrene<br>Plus Tri (2-hexadecyl)hydroquinone | 0.05<br>0.05 | 0.29 | 1.27 | 0.98 |

Example II

The oxidation resistance of samples of a high-impact polystyrene resin of a commercially available type and containing various concentrations of 9-hydroxy-9,10-boroxarophenanthrene, its anhydride and combinations thereof with tri(2-hexadecyl)hydroquinone and dilauryl-3,3'-thiodipropionate was tested. Preparation and oxidation of the samples were carried out under the conditions described hereinbefore.

Determinations of the melt index of the samples were carried out by ASTM Test Method D1238 at the same conditions as in Example I. Table II sets forth the results of the melt index tests.

Example III

The oxidation resistance of samples of a commercially available polypropylene resin containing various concentrations of 9-hydroxy-9,10-boroxarophenanthrene, its anhydride and combinations thereof with 2-tri(hexadecyl) hydroquinone and dilauryl-3,3'-thiodipropionate was tested. Preparation and oxidation of the samples were carried out as described hereinbefore. Melt index determinations were made by ASTM Test Method D1238 at 230° C. and with a weight of 2160 grams on the rod (the calculated equivalent of 43.25 p.s.i.). The results are set forth in Table III.

TABLE III.—EFFECTIVENESS OF ANTI-OXIDANTS IN POLYPROPYLENE

| Sample No. | Anti-oxidant(s) | Concentration of anti-oxidant in polymer, wt. percent | Melt index | | |
|---|---|---|---|---|---|
| | | | Before oxidation | After oxidation | Change due to oxidation |
| 1 | None | | ca. 2 | >25 | >23 |
| 2 | Tri(2-hexadecyl) hydroquinone | 0.1 | 1.20 | >25 | >23 |
| 3 | 9-hydroxy-9,10-boroxarophenanthrene | 0.1 | 1.63 | 12.87 | 11.24 |
| 4 | Anydride of 9-hydroxy-9,10-boroxarophenanthrene | 0.1 | 2.63 | 12.81 | 10.18 |
| 5 | 9-hydroxy-9,10-boroxarophenanthrene | 0.2 | 1.20 | 5.69 | 4.49 |
| 6 | Anydride of 9-hydroxy-9,10-boroxarophenanthrene | 0.2 | 1.20 | 5.49 | 4.29 |
| 7 | Tri(2-hexadecyl)hydroquinone | 0.2 | 1.20 | 14.13 | 12.93 |
| 8 | 9-hydroxy-9,10-boroxarophenanthrene<br>Plus Tri (2-hexadecyl)hydroquinone | 0.02<br>0.08 | 1.20 | 6.87 | 5.67 |
| 9 | Anyhdride of 9-hydroxy-9,10-boroxarophenanthrene<br>Plus Tri (2-hexadecyl)hydroquinone | 0.02<br>0.08 | 1.20 | 11.33 | 10.13 |
| 10 | 9-hydroxy-9,10-boroxarophenanthrene<br>Plus Tri (2-hexadecyl) hydroquinone | 0.04<br>0.16 | 1.20 | 4.50 | 3.30 |
| 11 | Anhydride of 9-hydroxy-9,10-boroxarophenanthrene<br>Plus Tri (2-hexadecyl)hydroquinone | 0.04<br>0.16 | 1.20 | 3.08 | 1.88 |
| 12 | 9-hydroxy-9,10-boroxarophenanthrene<br>Plus Dilauryl-3,3'-thiodipropionate | 0.05<br>0.25 | 1.20 | 2.76 | 1.56 |
| 13 | Anhydride of 9-hydroxy-9,10-boroxarophenanthrene<br>Plus Dilauryl-3,3'-thiodipropionate | 0.05<br>0.25 | 1.20 | 1.52 | 0.32 |

TABLE II.—EFFECTIVENESS OF ANTI-OXIDANTS IN HIGH-IMPACT POLYSTYRENE

| Sample No. | Anti-oxidant(s) | Concentration of anti-oxidant in polymer, wt. percent | Melt index | | |
|---|---|---|---|---|---|
| | | | Before oxidation | After oxidation | Change due to oxidation |
| 1 | None | | 1.10 | 2.68 | 1.58 |
| 2 | 9-hydroxy-9,10-boroxarophenanthrene | 0.1 | 1.10 | 1.05 | −0.05 |
| 3 | Anhydride of 9-hydroxy-9,10-boroxarophenanthrene | 0.1 | 1.10 | 2.61 | 1.51 |
| 4 | 9-hydroxy-9,10-boroxarophenanthrene | 0.2 | 1.30 | 1.63 | 0.33 |
| 5 | Anhydride of 9-hydroxy-9,10-boroxarophenanthrene | 0.2 | 1.30 | 1.44 | 0.14 |
| 6 | Dilauryl-3,3'-thiodipropionate | 0.25 | 1.30 | 1.80 | 0.50 |
| 7 | 9-hydroxy-9,10-boroxarophenanthrene<br>Plus Tri (2-hexadecyl) hydroquinone | 0.02<br>0.08 | 1.30 | 1.54 | 0.24 |
| 8 | Anhydride of 9-hydroxy-9,10-boroxarophenanthrene<br>Plus Tri (2-hexadecyl) hydroquinone | 0.02<br>0.08 | 1.30 | 1.66 | 0.36 |
| 9 | 9-hydroxy-9,10-boroxarophenanthrene<br>Plus Tri (2-hexadecyl) hydroquinone | 0.04<br>0.16 | 1.30 | 0.93 | −0.37 |
| 10 | Anhydride of 9-hydroxy-9,10-boroxarophenanthrene<br>Plus Tri (2-hexadecyl) hydroquinone | 0.04<br>0.16 | 1.30 | 0.99 | −0.31 |
| 11 | 9-hydroxy-9,10-boroxarophenanthrene<br>Plus Dilauryl-3, 3' thiodipropionate | 0.05<br>0.25 | 1.03 | 1.03 | −0.27 |
| 12 | Anhydride of 9-hydroxy-9,10-boroxarophenanthrene<br>Plus Dilauryl-3, 3'-thiodipropionate | 0.05<br>0.25 | 1.30 | 1.01 | −0.29 |

Example IV

The oxidation resistance of a sample of a commercially available polypropylene resin containing 0.1% (wt.) of 9-hydroxy-9,10-boroxarophenanthrene was compared with that of another sample of the same resin containing no anti-oxidant. Sample preparation and oxidation were carried out as described hereinbefore. Melt index tests, which were carried out under the conditions specified in Example III, revealed that the melt index of the unoxidized sample was 1.50, that of the oxidized sample containing no anti-oxidant was 17.56 (an increase of 16.06 due to oxidation) and that of the oxidized sample containing 0.1% of 9-hydroxy-9,10-boroxarophenanthrene was 2.64 (an increase of 1.14 due to oxidation).

Although the present invention has been described with preferred embodiments, it should be understood that modifications and variations thereof may be employed without departing from the spirit and scope of this invention, as those skilled in the art will readily understand. Such variations and modifications are therefore considered to be within the purview and scope of the appended claims.

We claim:

1. A solid polymer selected from the group consisting of (1) homopolymers of an olefinic hydrocarbon and (2) copolymers of a plurality of olefinic hydrocarbons, stabilized with a minor amount sufficient to increase the oxidation resistance thereof a 9,10-boroxarophenanthrene compound having the structural formula:

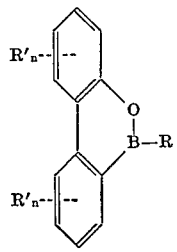

in which R is selected from the group consisting of hydrogen, hydroxy, hydrocarbyl, oxyhydrocarbyl, halogen, halogenated hydrocarbyl, halogenated oxyhydrocarbyl, aminoethoxy, N-hydrocarbylaminoethoxy, N,N-dihydrocarbyl-aminoethoxy, and oxy-9,10-boroxarophenanthrene; R' is selected from the group consisting of hydrocarbyl, halogen and halogenated hydrocarbyl; and $n$ is zero or an integer from one to four.

2. A composition, as defined in claim 1, in which said 9,10-boroxarophenanthrene compound is 9-hydroxy-9,10-boroxarophenanthrene.

3. A composition, as defined in claim 1, in which said 9,10-boroxarophenanthrene compound is the anhydride of 9-hydroxy-9,10-boroxarophenanthrene.

4. A composition, as defined in claim 1, in which said olefinic hydrocarbon is characterized by the structure $CH_2=CR_2$, in which each R is selected from the group consisting of hydrogen, alkyl, alkenyl, aryl, aralkyl, alkaryl, and alicyclic.

5. A composition, as defined in claim 1, in which said olefinic hydrocarbon is an alpha-olefin containing from two to four carbon atoms.

6. A composition, as defined in claim 1, in which said olefinic hydrocarbon is styrene.

7. A composition, as defined in claim 1, in which said normally solid polymer is polypropylene.

8. A composition, as defined in claim 1, in which said normally solid polymer is high-impact polystyrene.

9. A composition comprising (A) a solid polymer selected from the group consisting of (1) homopolymers of an olefinic hydrocarbon and (2) copolymers of a plurality of olefinic hydrocarbons, (B) a 9,10-boroxarophenanthrene compound having the structural formula:

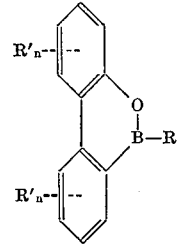

in which R is selected from the group consisting of hydrogen, hydroxy, hydrocarbyl, oxyhydrocarbyl, halogen, halogenated hydrocarbyl, halogenated oxyhydrocarbyl, aminoethoxy, N-hydrocarbylaminoethoxy, N,N-dihydrocarbyl-aminoethoxy, and oxy-9,10-boroxarophenanthrene; R' is selected from the group consisting of hydrocarbyl, halogen and halogenated hydrocarbyl; and $n$ is zero or an integer from one to four, and (C) a compound selected from the group consisting of dilauryl-3,3'-thiodipropionate and a polyalkyl-hydroxyaromatic compound containing at least two hydroxy groups and at least three primary or secondary alkyl groups of at least 12 carbon atoms attached to the aromatic nucleus, the aromatic nucleus being phenyl or naphthyl, said (B) and (C) being present together in minor amounts based on the weight of said polymer and sufficient to increase the oxidation resistance thereof.

10. A composition, as defined in claim 9, in which said 9,10-boroxarophenanthrene compound is 9-hydroxy-9,10-boroxarophenanthrene.

11. A composition, as defined in claim 9, in which said 9,10-boroxarophenanthrene compound is the anhydride of 9-hydroxy-9,10-boroxarophenanthrene.

12. A composition, as defined in claim 9, in which said (C) is tri(2-hexadecyl)hydroquinone 13. A composition, as defined in claim 9, in which said olefinic hydrocarbon is characterized by the structure $CH_2=CH_2$, in which each R is selected from the group consisting of hydrogen, alkyl, alkenyl, aryl, aralkyl, alkaryl, and alicyclic.

14. A composition, as defined in claim 9, in which said olefinic hydrocarbon is an alpha-olefin containing from two to four carbon atoms.

15. A composition, as defined in claim 9, in which said olefinic hydrocarbon is styrene.

16. A composition, as defined in claim 9, in which said normally solid polymer is polypropylene.

17. A composition, as defined in claim 9, in which said normally solid polymer is high-impact polystyrene.

References Cited
UNITED STATES PATENTS 3,193,521  7/1965  Jasching _____ 260—45.8

DONALD E. CZAJA, *Primary Examiner.*

M. J. WELSH, *Assistant Examiner.*